United States Patent
Dyre

[15] 3,651,655
[45] Mar. 28, 1972

[54] CONTROL SYSTEM FOR MULTIPLE STAGE ABSORPTION REFRIGERATION SYSTEM

[72] Inventor: Eddie L. Dyre, Syracuse, N.Y.
[73] Assignee: Carrier Corporation, Syracuse, N.Y.
[22] Filed: Aug. 10, 1970
[21] Appl. No.: 62,467

[52] U.S. Cl. .................................. 62/103, 62/141, 62/148, 62/476
[51] Int. Cl. ........................................................ F25b 15/06
[58] Field of Search ........................... 62/141, 148, 101, 476; 236/78 A

[56] References Cited

UNITED STATES PATENTS

| | | | |
|---|---|---|---|
| 3,530,684 | 9/1970 | Porter | 62/148 X |
| 3,266,266 | 8/1966 | Reid, Jr. | 62/476 |
| 3,146,604 | 9/1964 | Swearingen | 62/497 X |
| 3,248,891 | 5/1966 | Swearingen | 62/141 X |
| 3,287,928 | 11/1966 | Reid, Jr. | 62/476 X |
| 3,452,551 | 7/1969 | Aronson | 62/148 |

Primary Examiner—William F. O'Dea
Assistant Examiner—P. D. Ferguson
Attorney—Harry G. Martin, Jr. and J. Raymond Curtin

[57] ABSTRACT

A multiple stage absorption refrigeration system is provided with a primary absorber, a primary evaporator, a high pressure generator, a low pressure generator having a high pressure condenser associated therewith and a low pressure condenser connected to provide refrigeration. A centrifugal pump forwards weak solution from the primary absorber to the high pressure generator. Intermediate strength absorbent solution passes through an intermediate solution passage extending between the high pressure generator and the low pressure generator. A steam valve controls heat input to the high pressure generator in response to the leaving chilled water temperature from the evaporator. A solution valve in the weak solution passage between the primary absorber and the high pressure generator is adjusted in accordance with a sensed level of solution in the intermediate solution passage, and the position of the stream valve so that the quantity of weak solution supplied to the high pressure generator is a direct function of both the difference in pressure between the generators and the refrigeration demand on the system.

4 Claims, 1 Drawing Figure

PATENTED MAR 28 1972
3,651,655
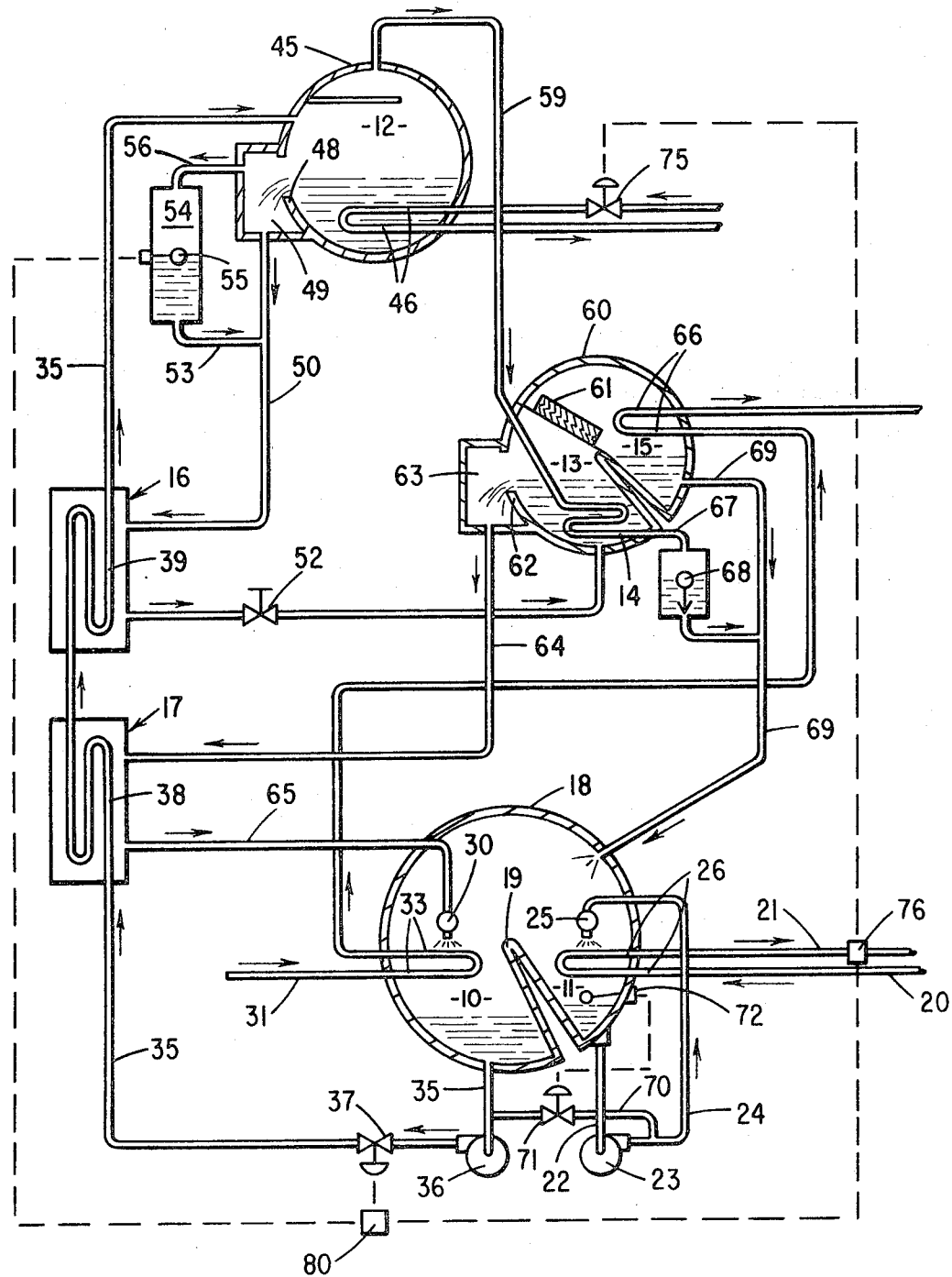
INVENTOR.
EDDIE L. DYRE
BY Frank N. Decker Jr.
ATTORNEY

CONTROL SYSTEM FOR MULTIPLE STAGE ABSORPTION REFRIGERATION SYSTEM

BACKGROUND OF THE INVENTION

Multiple stage absorption refrigeration systems are capable of providing the well-known advantage of reduced operating costs because of their more efficient utilization of the input heat energy to the machine. However, previous systems have frequently exhibited stability problems due, in part, to the fact that the pressure difference between the high pressure generator and the absorber fluctuates sufficiently to produce variations in solution flow under varying operating conditions. Consequently, when the pressure in the high pressure generator drops, it may be overfed with solution by a typical centrifugal solution pump which is characteristically highly sensitive to head pressure. Or, on the other hand, in the event that the pressure difference between the high pressure generator and the low pressure generator decreases, there may be an underwithdrawal of intermediate solution from the high pressure generator due to insufficient pressure difference between the high pressure and low pressure generators. Either of these conditions can cause flooding of the high pressure generator which results in instability in the system.

It has been previously suggested to improve the stability of a multiple stage absorption refrigeration system, while achieving increased part-load efficiency, by modulating the solution flow to the high pressure generator in response to the difference in pressure between the high pressure generator and the low pressure generator. This may be achieved, for example, by controlling the flow of weak solution to the high pressure generator at a rate which is a function of the level of solution in the intermediate solution passage between the generators so as to maintain a uniform intermediate solution level. While this proposal results in a substantially improved system having much better stability than conventional multiple stage systems, there are circumstances where the solution valve may get out of phase with the changes in pressure between the two generators due to transient conditions within the machine. For example, a change in refrigeration capacity or cooling water temperature may produce a pressure change sufficiently prior to reaction of the solution valve that the solution valve will thereafter overshoot and either underfeed or overfeed the high pressure generator which in turn will cause another change in the solution flow rate and tends to produce instability until the system reaches a new equilibrium. In addition, there is a tendency for the solution level in the intermediate solution passage to drop whenever weak solution flow to the high pressure generator is suddenly increased because the cold solution in the generator stops boiling momentarily and reduces the rate of intermediate solution overflowing the generator weir. Consequently, if the solution valve is controlled solely as a function of the intermediate solution level, the solution valve will be opened still wider causing even greater flow to the high pressure generator until boiling is resumed, at which time there will be excessive intermediate solution overflowing the generator and requiring the solution valve opening to be greatly reduced. Thus, there is the possibility of some instability in such prior systems.

SUMMARY OF THE INVENTION

In accordance with this invention, there is provided a control system having improved stability for a multiple stage absorption refrigeration system. A heating medium control valve such as a steam valve is adjusted to control the quantity of heating medium supplied to the high pressure generator in response to the refrigeration demand imposed on the system. A solution flow control valve is disposed in the weak solution passage between the primary absorber and the high pressure generator for controlling the rate of solution flow to the generator. The solution flow control valve is adjusted as a direct combined function of both the difference in pressure between the high pressure generator and the low pressure generator, and the refrigeration demand on the system.

In the preferred embodiment, the pressure difference between the generators is sensed by a level control which provides a signal which is a function of the level of intermediate solution in the intermediate solution passage connecting the generators. The refrigeration demand on the system is sensed by sensing the temperature of chilled water leaving the evaporator. The two signals are summed to provide a combined signal which adjusts the solution valve control as a direct function of the refrigeration demand and an inverse function of the intermediate solution level.

A control system in accordance with this invention provides increased stability because of the interaction between the refrigeration demand signal and the pressure difference or level signal. The solution valve will open when both the refrigeration demand is increasing and the intermediate solution level is decreasing. Similarly, when the capacity is decreasing and the intermediate solution level is increasing, the solution flow to the high pressure generator will be reduced. However, at times when the intermediate solution level is rising, indicating a reduced generator pressure difference, but the steam valve is relatively open, indicating a large refrigeration demand, the control signals will partially offset each other so that the solution valve will not be permitted to close excessively and the generator pressure will have a chance to catch up with the refrigeration demand. Similarly, if the intermediate solution level is dropping but the steam valve is relatively closed, the control signals will partially offset each other and prevent the solution valve from opening excessively, thus contributing to improved stability.

BRIEF DESCRIPTION OF THE DRAWING

The drawing schematically illustrates a two-stage absorption refrigeration system having a control system in accordance with this invention.

DESCRIPTION OF THE PREFERRED EMBODIMENT

This invention will be described with reference to a two-stage absorption refrigeration system of the type using water as a refrigerant and an aqueous solution of lithium bromide as an absorbent. Other absorbent and refrigerant combination and other multiple stage machines can be utilized. "Strong solution" as used herein refers to a concentrated solution of lithium bromide which is strong in absorbing power and "weak solution" refers to a dilute solution of absorbent which is weak in absorbing power. "Intermediate solution" refers to a concentration of absorbent which is intermediate in strength between the weak and strong solutions.

The preferred system principally comprises a primary absorber 10, a primary evaporator 11, a high pressure generator 12, a low pressure generator 13 having a high pressure condenser 14 associated therewith, and a low pressure condenser 15 connected to provide refrigeration. A high stage solution heat exchanger 16 and a low stage solution heat exchanger 17 are provided to improve the thermodynamic efficiency of the absorption cycle. Low stage heat exchanger 17 may be either of the sensible heat exchange type, as illustrated, or of the flash heat exchange type employing a plurality of auxiliary evaporators in the strong solution passage and a plurality of auxiliary absorbers in the weak solution passage in vapor communication with the corresponding auxiliary evaporator stages. A second solution pump may also be used in such a system.

Shell 18 is divided by a partition 19 into primary absorber 10 and primary evaporator 11. Water to be chilled enters evaporator 11 through entering chilled water passage 20 and the cooled water leaves the evaporator through leaving chilled water passage 21. Liquid refrigerant is withdrawn from the bottom of evaporator 11 through passage 22 from which it is pumped by pump 23 through passage 24 and spray header 25 over evaporator heat exchange tubes 26. Refrigerant is vaporized by absorbing heat from the water passing through evaporator heat exchange tubes 26 and the resulting vapor passes to primary absorber 10.

Strong absorbent solution is sprayed over absorber heat exchange tubes 33 through spray header 30. A suitable cooling medium such as water from a cooling tower is passed from cooling medium passage 31 through heat exchange tubes 33 to cool the strong absorbent solution passing over them. The refrigerant vapor formed in evaporator 11 is absorbed into the cooled strong solution in absorber 10 and the resulting weak solution accumulates in a sump in the bottom of the absorber. The accumulated weak solution is pumped from absorber 10 to high pressure generator 12 through a weak solution passage 35 which includes pump 36, solution flow control valve 37, heat exchange tubes 38 and 39 of solution heat exchangers 17 and 16, respectively.

High pressure generator 12 comprises a shell 45 having a plurality of generator heat exchange tubes 46 and an overflow weir 48 which may comprise a wall of shell 45. Weak solution is boiled in high pressure generator 12 by passing steam or other suitable heating medium through generator heat exchange tubes 46 in heat transfer relation with the weak solution. The weak solution is thereby concentrated by vaporizing refrigerant therefrom, and becomes intermediate strength solution. The level of solution in generator 12 is maintained constant by overflow weir 48, and intermediate strength solution spills over weir 48 into intermediate solution chamber 49.

The intermediate solution passes from high pressure generator 12 to low pressure generator 13 through an intermediate solution passage 50 which includes intermediate solution chamber 49, the shell side of high stage solution heat exchanger 16, and a valve or other restriction 52. A manually adjustable valve 52 is illustrated in intermediate solution passage 50, but a fixed orifice restriction device may be utilized or the passage may be sufficiently restricted to maintain desired pressure difference between generators 12 and 13.

The intermediate solution passage preferably presents a substantially fixed restriction to the flow of intermediate solution between high pressure generator 12 and low pressure generator 13. Consequently, the rate of flow of intermediate solution from generator 12 to generator 13 is a function of the difference in pressures therebetween. It is therefore preferred to sense the difference in pressures between the generators by sensing the level of intermediate solution in the intermediate solution passage and desirably in intermediate solution chamber 49. This is achieved by providing a passage 53 communicating with intermediate solution passage 50 and connected to a float level chamber 54 having a suitable float level sensor 55 therein. The top of level chamber 54 is vented to high pressure generator 12 through vent passage 56 so that the level of intermediate solution in float chamber 54 accurately reflects the level of intermediate solution in the intermediate solution passage connecting generators 12 and 13.

Shell 60 is divided by a suitable partition and an eliminator assembly 61 into low pressure generator 13 and low pressure condenser 15. Vapor formed in high pressure generator 12 passes through vapor passage 59 and is condensed in the heat exchange tubes of high pressure condenser 14, where it gives up its heat to boil the intermediate solution in generator 13. The refrigerant vaporized from the solution in low pressure generator 13 passes through eliminator 61 and is condensed by heat exchange with the cooling medium passing from absorber heat exchange tube 33 through heat exchange tubes 66 in the low pressure condenser. The condensed refrigerant from high pressure condenser 14 passes through refrigerant passage 67 and float valve 68 into refrigerant passage 69 where it is joined with the refrigerant condensed in low pressure condenser 15. The condensed refrigerant then passes from refrigerant passage 69 into primary evaporator 11 where it passes over evaporator heat exchange tubes 26. The remaining unevaporated liquid refrigerant is collected in the evaporator sump for recirculation over the heat exchange tubes.

The intermediate solution in low pressure generator 13, which is concentrated by vaporizing refrigerant therefrom to form strong solution, spills over weir 62 into strong solution chamber 63. The strong solution passes through a strong solution passage 64 comprising chamber 63, the shell side of low stage solution heat exchanger 17 and passage 65 through spray header 30 for discharge over absorber heat exchange tubes 33.

A dilution passage 70 having a dilution valve 71 therein is connected between the discharge of refrigerant pump 23 and the inlet of weak solution pump 36. A level control 72 is disposed to sense the level of refrigerant in evaporator 11. In the event that the refrigerant level rises to a point which indicates that the absorber solution is becoming overconcentrated, the dilution valve will open to admit refrigerant into the absorber solution circuit, thereby preventing the absorbent solution from becoming crystalized.

The temperature of the chilled water supplied to the refrigeration load through chilled water passage 21 is primarily controlled by regulating the supply of heat to high stage generator 12. In the illustrated system, a steam control valve 75 controls the quantity of steam admitted to generator heat exchange tubes 46. In a direct-fired machine, the capacity may be controlled by varying the supply of fuel to the burners, and in a liquid heated system, the supply of hot liquid may be regulated. A temperature sensing bulb 76 is secured to leaving chilled water line 21 to sense the refrigeration demand imposed on the system. The signal provided by temperature sensor 76 is provided to steam valve 75 to control the position of the steam valve as a direct function of the sensed refrigeration demand. The steam valve will open wider upon sensing a rise in chilled water temperature, and vice versa, to maintain a substantially constant chilled water temperature. It will be appreciated that either electric or pneumatic controls and control circuitry of well-known design may be utilized to achieve this function and that the control may include a dead band and feedback circuitry to provide a desired proportional band control characteristic.

When either the chilled water passing through absorber heat exchanger 33 and condenser heat exchanger 66 drops, or when the refrigeration demand imposed on the system is reduced, the thermodynamic efficiency of the refrigeration system may be increased in order to reduce the operating costs. In order to achieve the increased efficiency, it is desirable to reduce the quantity of weak solution supplied to high pressure generator 12. For this purpose, solution flow control valve 37 is provided in weak solution passage 35. It is preferred to locate valve 37 in passage 35 between pump 36 and low stage solution heat exchanger 17, particularly if the low stage solution heat exchanger is of other than the sensible type, such as a flash heat exchanger using auxiliary absorbers and evaporators. If heat exchanger 17 is a flash heat exchanger, valve 37 is preferably located between the absorber and the flash heat exchanger and a second pump is located between heat exchangers 16 and 17, which should be of a type which can pump the maximum solution volume passed by valve 37. However, in the illustrated system, utilizing conventional heat exchangers, solution flow control valve 37 may be located at any convenient point in the weak solution passage.

Solution flow control valve 37 is provided with a control circuit 80 which may be of either the electric or pneumatic type to control the position of valve 37 and the rate of weak solution flow to generator 12. A suitable electric or pneumatic control circuit 80 is provided to adjust the position of solution flow control valve 37. Control circuit 80 preferably receives a signal from float control 55 which is an inverse function of the sensed level of intermediate solution in passage 50, or any other signal which is a direct function of the difference in pressures between generators 12 and 13. In addition, control circuit 80 receives a signal from chilled water sensor 76 which is a direct function of the temperature of the chilled water leaving evaporator 11 which corresponds to the refrigeration demand imposed on the system. The position of steam valve 75 may be sensed for this purpose or the chilled water temperature signal may be used. These two signals are added, in some predetermined ratio, to provide a combined or summed control signal which varies the position of valve 37 as a direct function of the difference in pressure between the generators and the refrigeration demand.

In operation, assuming the absorption refrigeration system is operating at design full load conditions, solution valve 37 is fully open and steam valve 75 is adjusted to a position which maintains the desired chilled water temperature in passage 21. In the event that the temperature of the cooling water supplied to the system or the refrigeration demand imposed on the system drops, the pressure in high pressure generator 12 will begin to drop. A drop in refrigeration demand will result in a drop in leaving chilled water temperature, which in turn will cause steam valve 75 to reduce the heat input to the high pressure generator, thereby reducing the pressure therein. Similarly, a drop in cooling water temperature will cause the pressure in primary absorber 10 to drop which will increase the capacity of the absorber and cause a corresponding drop in evaporator temperature. The drop in evaporator temperature will be reflected by a drop in leaving chilled water temperature and steam valve 75 will tend to close, thereby reducing the high stage generator pressure. While the temperature in low pressure generator 13 will also drop, the corresponding reduction in pressure in the low pressure generator will be less than the reduction in pressure in the high pressure generator due to the basic laws governing boiling liquids. Consequently, the difference in pressure between the generators will be reduced at either low loads or low cooling water temperatures. The reduction in pressure between the generators will result in less intermediate solution passing through intermediate solution passage 50 to low pressure generator 13 and the level of solution will begin to rise in intermediate solution chamber 49 or elsewhere in the intermediate solution passage.

The rise in intermediate solution level in passage 50 will provide a decreased control signal to control circuit 80. This control signal is summed in control circuit 80 with the control signal produced by chilled water temperature sensor 76. The combined signal is supplied to adjust the position of solution flow control valve 37. If the chilled water temperature is also low or decreasing under the above conditions, the solution valve will move toward its closed position to reduce the supply of solution to the high pressure generator.

The control arrangement of this invention greatly improves stability over prior arrangements because of the summation of two control signals for the operation of the solution flow control valve. Thus, when steam valve 75 is in a substantially open position, perturbations in the level of solution in line 50 will have a relatively negligible effect on the position of control valve 37. A momentary drop in the pressure in generator 12 will not cause substantial closure of valve 37 and, in effect, the generator will be given time to reach a new high pressure equilibrium state consistent with the large refrigeration demand indicated by the open position of the steam valve. On the other hand, when the steam valve is in a relatively closed position, a momentary drop in the level of intermediate solution in passage 50 will not result in a large opening of solution valve 37 because of the relatively small refrigeration load which indicates that the generator will eventually reach a low equilibrium pressure.

In effect, the summation of a control signal which is a direct function of the refrigeration demand with a control signal which is a direct function of the pressure difference between generators 12 and 13, results in anticipating new equilibrium states so that inconsistent signals tend to cancel themselves out and reduce changes in solution flow based on transient conditions. The effect of the two control signals may be appropriately weighted in the final control function to produce the desired stability.

It will be apparent that the specific control signals may be of any desired magnitude and may vary in either direction depending on the requirements of the various servo-mechanisms and controls which may be used to mechanically actuate the solution valve. Furthermore, a combination of electric and pneumatic controls with suitable intermediate transducers may be utilized to achieve the control functions described.

Various other modifications of this invention may be made such as replacing the solution level sensor 55 with a differential pressure sensor which directly reads the difference in pressures between the generators. It is also possible to use a differential thermostat responsive to the temperature of intermediate solution leaving generator 12 and strong solution leaving generator 13 to obtain a control signal for control circuit 80 which is a function of the difference in pressure between the two generators.

While for purposes of illustration a preferred embodiment has been described, it will be understood that this invention may be otherwise embodied within the scope of the following claims.

I claim:

1. A multiple stage absorption refrigeration system comprising:
   A. a primary absorber for absorbing refrigerant vapor into absorbent solution;
   B. a primary evaporator for evaporating refrigerant to provide cooling;
   C. a high pressure generator including heating means for heating absorbent solution therein to concentrate the absorbent solution by vaporizing refrigerant therefrom;
   D. a low pressure generator having a high pressure condenser section associated therewithin;
   E. a low pressure condenser;
   F. weak solution passage means for passing weak absorbent solution from said primary absorber to said high pressure generator for concentration therein;
   G. intermediate solution passage means for passing intermediate strength absorbent solution from said high pressure generator to said low pressure generator for further concentration therein;
   H. strong solution passage means for passing strong absorbent solution from said low pressure generator to said primary absorber for absorption of refrigerant vapor therein;
   I. high pressure refrigerant vapor passage means for passing high pressure refrigerant vapor formed in said high pressure generator through the high pressure condenser section of said low pressure generator for condensing said vapor and heating solution in said low pressure generator;
   J. low pressure refrigerant vapor passage means for passing low pressure refrigerant vapor formed in said low pressure generator to said low pressure condenser for condensing said vapor;
   K. refrigerant liquid passage means for passing condensed refrigerant to said primary evaporator for evaporation therein;
   L. refrigerant vapor passage means for passing evaporated refrigerant from said primary evaporator to said primary absorber for absorption into absorbent solution;
   M. weak solution pump means in said weak solution passage means for pumping absorbent solution from said primary absorber to said high pressure generator; wherein the improvement comprises:
   N. means for sensing the refrigeration demand imposed on said system;
   O. heating medium control means associated with said high pressure generator for varying the quantity of heat supplied thereto as a direct function of the sensed refrigeration demand imposed on said system;
   P. said intermediate solution passage comprising a substantially fixed unvarying restriction to flow of intermediate solution to said low pressure generator under all conditions of operation of the system;
   Q. means for sensing the difference in pressure between said high pressure generator and said low pressure generator; and
   R. solution flow control valve means in said weak solution passage for varying the quantity of weak solution supplied to said high pressure generator in response to a combined direct function of both the refrigeration demand imposed on said system and the difference in pressure between said high pressure generator and said low pressure generator.

2. A multiple stage absorption refrigeration system as defined in claim 1 wherein said means for sensing the refrigeration demand on said system comprises means for sensing the temperature of fluid chilled in said evaporator and for providing a first control signal which is a function thereof, said means for sensing the difference in pressure between said high pressure generator and said low pressure generator comprises means for sensing a level of intermediate solution in said intermediate solution passage and for providing a second control signal which is a function thereof; and said system includes control means for adjusting the opening of said solution flow control valve to provide a rate of flow of weak solution to the high pressure generator which is a function of a summation of a direct function of the sensed refrigeration demand and an inverse function of the sensed intermediate solution level.

3. In a method of producing refrigeration from an absorption refrigeration system having a primary absorber, a high pressure generator, a low pressure generator having a high pressure condenser associated therewith, a low pressure condenser, a primary evaporator and a weak solution pump operatively connected to provide refrigeration, the steps comprising:
   A. pumping weak solution from the primary absorber to the high pressure generator;
   B. supplying heat to the high pressure generator to concentrate weak absorbent solution therein by vaporizing refrigerant from the weak solution to form intermediate solution;
   C. condensing in the high pressure condenser refrigerant vapor formed in the high pressure generator in heat exchange relation with intermediate solution in the low pressure generator, to further concentrate intermediate solution in the low pressure generator by vaporizing additional refrigerant therefrom, thereby forming strong solution;
   D. condensing refrigerant vapor formed in the low pressure generator in the low pressure condenser;
   E. evaporating condensed refrigerant in the primary evaporator to provide refrigeration;
   F. absorbing in the primary absorber refrigerant vapor formed in the primary evaporator into strong solution formed in the low pressure generator;
wherein the improvement comprises:
   G. regulating the quantity of heat supplied to the high pressure generator in accordance with a direct function of the refrigeration demand on said system;
   H. regulating the quantity of weak solution supplied to the high pressure generator in accordance with a combined direct function of the refrigeration demand imposed on said system and the difference in pressure between the high pressure generator and the low pressure generator; and
   I. passing intermediate strength solution through an unregulated fixed restriction from the high pressure generator to the low pressure generator under all conditions of operation of the system.

4. A method of producing refrigeration as defined in claim 3, wherein said system includes a solution flow control means for regulating the passage of weak solution from the absorber to the high pressure generator, which includes the steps of sensing the difference in the pressure between the high pressure generator and the low pressure generator by sensing a level of intermediate solution in an intermediate solution passage extending between said generators, and providing a first control signal which is a function of the sensed intermediate solution level; sensing the refrigeration demand imposed on the system by sensing the temperature of a fluid cooled in the evaporator, and providing a second control signal which is a function of the sensed refrigeration demand; and summing the first and second control signals to provide a control signal for regulating the flow of weak solution through said solution flow control valve which is a direct function of the sensed refrigeration demand and an inverse function of the sensed intermediate solution level.

* * * * *